(12) United States Patent
Bennie et al.

(10) Patent No.: US 11,415,989 B2
(45) Date of Patent: Aug. 16, 2022

(54) DRONE-BASED TRACKING

(71) Applicant: Ford Global Technologies, LLC, Dearborn, MI (US)

(72) Inventors: Brian Bennie, Sterling Heights, MI (US); Cynthia M. Neubecker, Westland, MI (US); Brad Alan Ignaczak, Canton, MI (US); Somak Datta Gupta, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 342 days.

(21) Appl. No.: 16/487,481

(22) PCT Filed: Feb. 24, 2017

(86) PCT No.: PCT/US2017/019236
§ 371 (c)(1),
(2) Date: Aug. 21, 2019

(87) PCT Pub. No.: WO2018/156139
PCT Pub. Date: Aug. 30, 2018

(65) Prior Publication Data
US 2020/0057445 A1  Feb. 20, 2020

(51) Int. Cl.
*G05D 1/00* (2006.01)
*H04W 4/029* (2018.01)
*B64C 39/02* (2006.01)
*B64D 1/18* (2006.01)
*B05B 13/00* (2006.01)
*G01S 17/66* (2006.01)

(52) U.S. Cl.
CPC ......... *G05D 1/0094* (2013.01); *B05B 13/005* (2013.01); *B64C 39/024* (2013.01); *B64D 1/18* (2013.01); *G01S 17/66* (2013.01); *H04W 4/029* (2018.02); *B64C 2201/12* (2013.01); *B64C 2201/141* (2013.01); *B64C 2201/208* (2013.01)

(58) Field of Classification Search
CPC ... G05D 1/0094; H04W 4/029; B05B 13/005; B64C 39/024; B64C 2201/12; B64C 2201/141; B64C 2201/208; B64D 1/18; G01S 17/66
See application file for complete search history.

(56) References Cited

U.S. PATENT DOCUMENTS

| | | |
|---|---|---|
| 6,952,646 B2 | 10/2005 | Chang |
| 7,765,062 B2 | 7/2010 | Ariyur et al. |
| 8,639,396 B1 | 1/2014 | Hirsch et al. |
| 9,026,272 B2 | 5/2015 | Kokkeby et al. |
| 9,127,908 B2 | 9/2015 | Miralles |

(Continued)

OTHER PUBLICATIONS

Miriam McNabb, "Microsoft's Police Car to Include Drones", Oct. 28, 2015, http://dronelife.com/2015/10/28/microsofts-police-platform-to-include-drones/.

(Continued)

*Primary Examiner* — Michael D Lang
(74) *Attorney, Agent, or Firm* — Brandon Hicks; Bejin Bieneman PLC

(57) ABSTRACT

A computer is programmed to determine a trajectory of a moving target based on data from one or more vehicle sensors. The computer is programmed to deploy an aerial drone from the vehicle to track the moving target based on the determined trajectory.

20 Claims, 8 Drawing Sheets

(56) References Cited

U.S. PATENT DOCUMENTS

| | | |
|---|---|---|
| 9,302,783 B2 | 4/2016 | Wang |
| 9,454,889 B2 | 9/2016 | Kerning |
| 9,471,059 B1 | 10/2016 | Wilkins |
| 9,555,885 B2 | 1/2017 | Stanek et al. |
| 2012/0210853 A1 | 8/2012 | Abershitz et al. |
| 2014/0061478 A1 | 3/2014 | Hiebl |
| 2015/0321758 A1 | 11/2015 | Sama, II |
| 2015/0350614 A1 | 12/2015 | Meier et al. |
| 2016/0236638 A1 | 8/2016 | Lavie et al. |
| 2016/0304217 A1 | 10/2016 | Fisher et al. |
| 2018/0093637 A1* | 4/2018 | Piccioni .................. H04W 4/02 |

OTHER PUBLICATIONS

Tyler Wall, "Unmanning the Police Manhunt: Vertical Security as Pacification", Socialist Studies / Études socialistes 9 (2) Winter 2013 Copyright © 2013 The Author(s).
International Search Report and Written Opinion dated May 4, 2017 re Appl. PCT/US2017/019236.
CN First Office Action dated Jun. 27, 2022.

\* cited by examiner

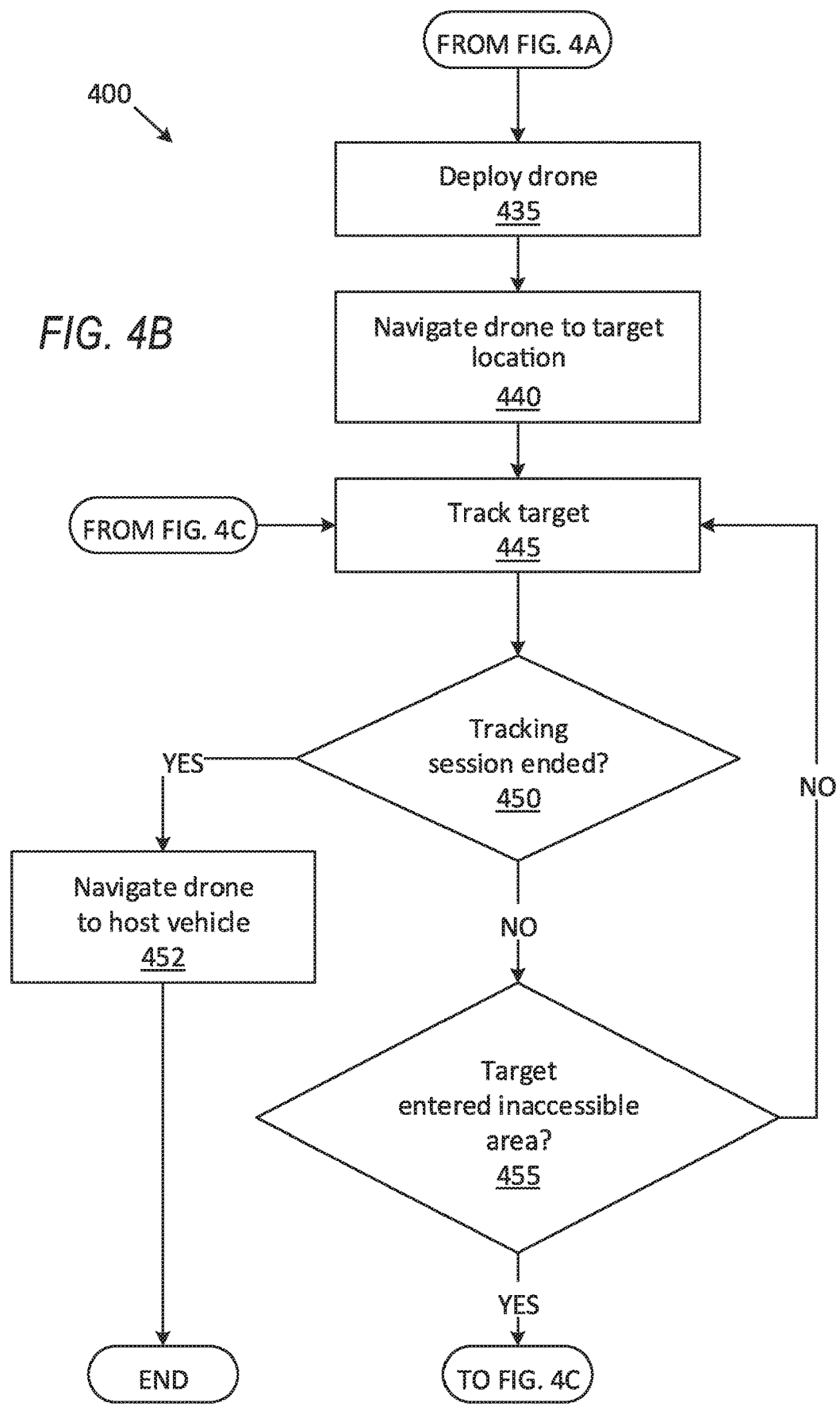

DRONE-BASED TRACKING

BACKGROUND

Police vehicles or the like may be equipped with electronic devices such as sensors and computers that provide assistance in pursuing of a suspect vehicle. For example, a first vehicle may include camera sensors that can detect suspected second vehicle and provide information regarding direction of movement, speed, etc., of the second vehicle. However, a person and/or an object may depart from the second vehicle and move to an area outside a detection range of sensors included in the first vehicle.

BRIEF DESCRIPTION OF THE DRAWINGS

FIGS. 4A-4C is a flowchart of an exemplary process for a host vehicle controlling a drone that tracks a target.

DETAILED DESCRIPTION

Introduction

Disclosed here in a method comprising determining a trajectory of a moving target based on data from one or more vehicle sensors, and deploying an aerial drone from the vehicle to track the moving target based on the determined trajectory.

The method may further include determining a current location of the target based on the data from the one or more vehicle sensors, and sending an instruction to the aerial drone to fly to a destination based on the determined current location.

The method may further include determining a location based on the determined trajectory, and actuating the drone to fly to the determined location.

The method may further include tracking the target by determining a current location of the target based on aerial drone sensor data, and actuating the drone to fly within a specified distance from the target while the target moves.

The method may further include tracking the target based on a current trajectory of the target determined based on the aerial drone sensor data.

The method may further include determining that the target entered an area that is inaccessible for the drone, and transmitting a last determined location and trajectory of the moving target to a remote computer.

The method may further include detecting a second vehicle based on the data from the one or more vehicle sensors, and detecting the moving target when the moving target departs the second vehicle. Detecting the moving target may be performed only upon determining that a door of the second vehicle is open.

The method may further include actuating a drone actuator to spray ink on the moving target.

The method may further include tracking the moving target further includes detecting a specific ink on the moving target.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

Figure 1A:
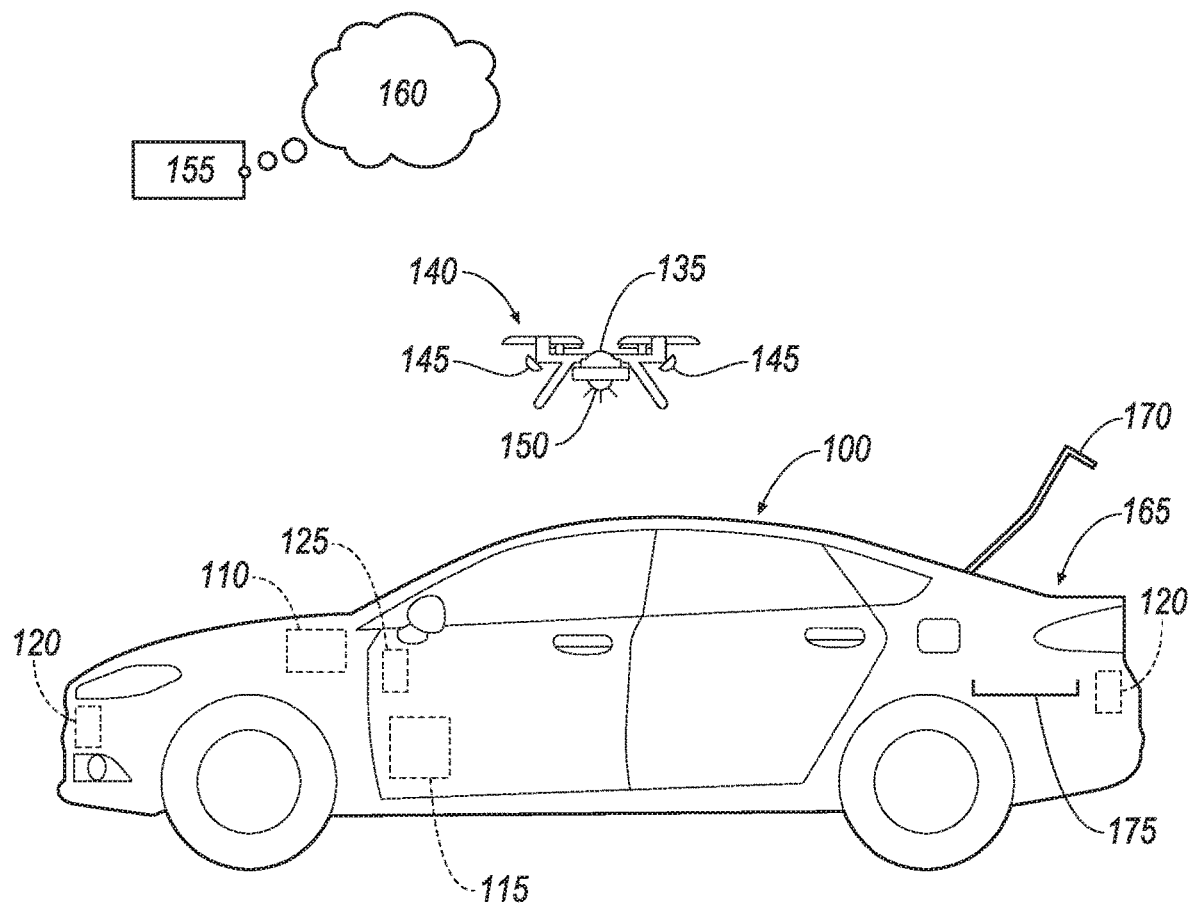
FIG. 1A is a block diagram of an example tracking system including a drone and an exemplary vehicle with a trunk door in an open position.
Figure 1B:
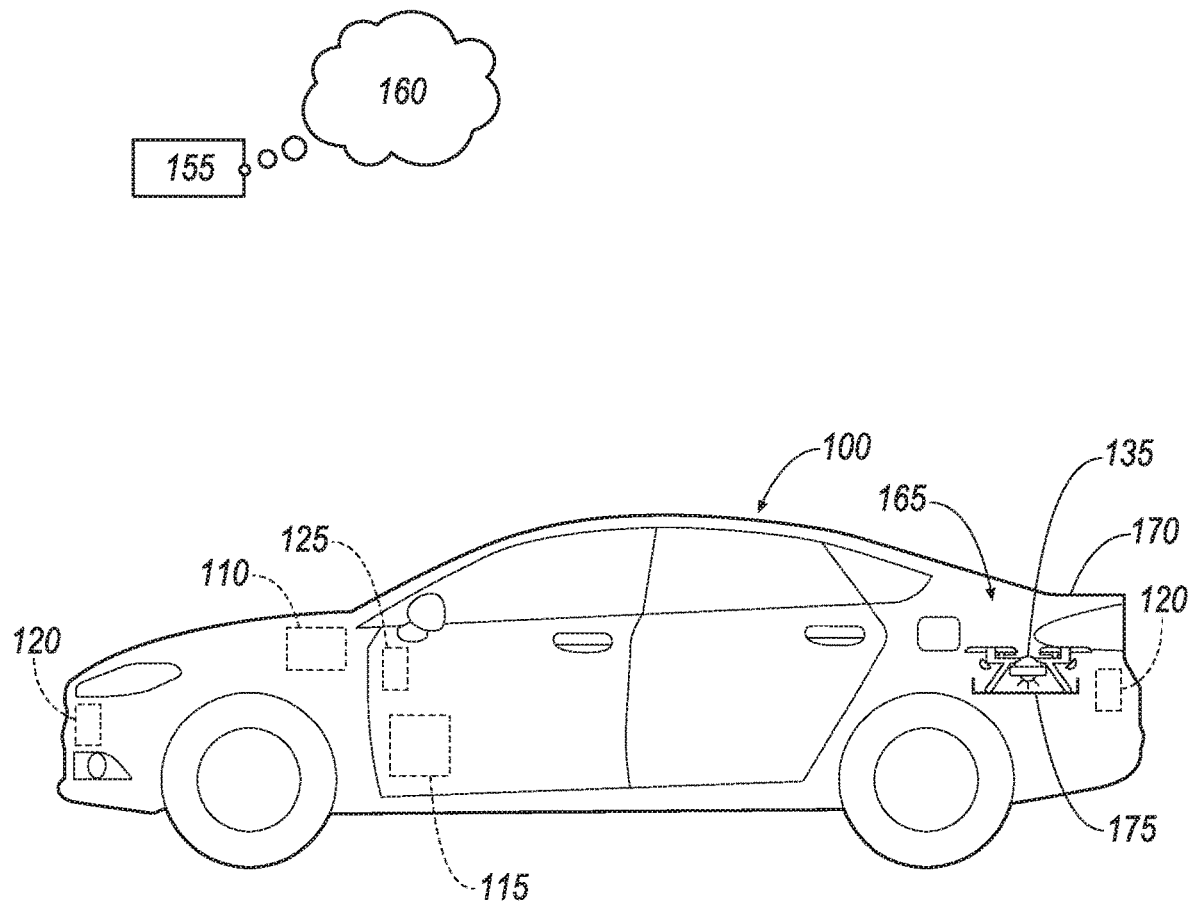
FIG. 1B shows the vehicle of FIG. 1A with the trunk door in a closed position and the drone placed inside a vehicle trunk.

FIGS. 1A-1B illustrate a vehicle 100. The vehicle 100, sometimes referred to for convenience as a first or host vehicle 100, may be powered in a variety of known ways, e.g., with an electric motor and/or internal combustion engine. The vehicle 100 may include any automobile such as a car, a truck, a sport utility vehicle, a crossover vehicle, a van, a minivan, etc. The vehicle 100 may include a computer 110, actuator(s) 115, sensor(s) 120, and a human machine interface (HMI) 125. In some possible approaches, as discussed below, the vehicle 100 is an autonomous vehicle 100 configured to operate in an autonomous (e.g., driverless) mode, a partially autonomous mode, and/or a non-autonomous mode.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer controls one or two of vehicle 100 propulsion, braking, and steering; in a non-autonomous mode, an operator controls the vehicle 100 propulsion, braking, and steering.

The computer 110 may include programming to operate one or more of land vehicle 100 brakes, propulsion (e.g., control acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 network, e.g., including a communications bus as described further below, more than one processor, e.g., controllers or the like included in the vehicle 100 for monitoring and/or controlling various vehicle controllers, e.g., a powertrain controller, a brake controller, a steering controller, etc. The computer 110 is generally arranged for communications on a vehicle 100 communication network that can include a bus in the vehicle 100 such as a controller area network (CAN) or the like, and/or other wired and/or wireless mechanisms.

Via a communication network of the vehicle 100, the computer 110 may transmit messages to various devices in the vehicle 100 and/or receive messages from the various devices, e.g., an actuator 115, an HMI 125, etc. Alternatively or additionally, in cases where the computer 110 actually comprises multiple devices, the vehicle communication network may be used for communications between devices represented as the computer 110 in this disclosure.

The actuators 115 of the vehicle 100 are implemented via circuits, chips, or other electronic and/or mechanical components that can actuate various vehicle 100 subsystems in accordance with appropriate control signals, as is known. The actuators 115 may be used to control vehicle systems such as braking, acceleration, and/or steering of the vehicles 100.

The sensors 120 of the vehicle 100 may include a variety of devices known to provide data via the vehicle communications bus. For example, the sensors 120 may include one or more camera, radar, infrared, and/or Light Detection And Ranging (LIDAR) sensors 120 disposed in the vehicle 100 and/or on the vehicle 100 providing data encompassing at least some of the vehicle exterior. The data may be received by the computer 110 through a suitable interface such as in known. A LIDAR sensor 120 disposed, e.g., on a top of the vehicle 100, may provide object data including relative locations, sizes, and shapes of objects such as other vehicles surrounding the vehicle 100. The computer 110 may receive the object data and operate the vehicle 100 in an autonomous and/or semi-autonomous mode based at least in part on the received object data.

The vehicle 100 may include a Global Positioning System (GPS) sensor 120 configured to determine coordinates of a current location of the vehicle 100. The computer 110 may be programed, using known navigation techniques, to identify a route from the current location to a selected destination, as well as display a map and present driving directions to the selected destination via, e.g., the HMI 125.

In addition, the computer 110 may be configured for communicating through a vehicle-to-infrastructure (V-to-I) interface with other vehicles 100, drones 135, and/or a remote computer 155 via a network 160. The network 160 represents one or more mechanisms by which the computer 110 and the remote computer 155 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks 160 include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

The HMI 125 presents information to and receives information from an occupant of the vehicle 100. The HMI 125 may be located, e.g., on an instrument panel in a passenger cabin of the vehicle 100, or one or more other locations accessible by the occupant. The HMI 125 may include dials, digital readouts, screens such as a touch-sensitive display screen, speakers, and so on for providing information to the occupant. The HMI 125 may include buttons, knobs, keypads, microphone, and so on for receiving information from the occupant. In one example, the vehicle 100 computer 110 may be programmed to select a second vehicle 200 (see FIG. 2) to pursue based on input received via the HMI 125. For example, the computer 110 may be programmed to present image data on the HMI 125 including multiple vehicles 200. The computer 110 may be further programmed to select a vehicle 200 to pursue upon touching an HMI 125 screen on an area of the HMI screen where the vehicle 200 is displayed. As discussed below, the vehicle 100 computer 110 may be programmed to output information on the HMI 125 including a current location of the selected vehicle 200 and/or location of its occupants, if one or more of selected vehicle 200 depart the selected vehicle 200.

The drone 135 is an unmanned aerial vehicle (UAV) and includes a number of circuits, chips, or other electronic and/or electromechanical components that can control various operations of the drone 135. For instance, the drone 135 may fly in accordance with control signals output to its propeller actuators 140. The drone 135 may be outfitted with a navigation system so that it can fly to, and hover at, a particular location. FIG. 1A illustrates the drone 135 located in a trunk 165 of the vehicle 100. FIG. 1B illustrates the drone 135 hovering over the host vehicle 100.

The drone 135 may include one or more camera sensors 145 that can capture images of an area near the drone 135. The drone 135 camera sensors 145 may be mounted to a same housing as the lights, and the drone 135 may be programmed to turn on the drone 135 camera sensors 145 to capture images of an area below the drone 135. Thus, when hovering over the vehicle 100, the drone 135 camera sensor 145 may capture images of the vehicle 100 and possibly the area around the vehicle 100. Additionally or alternatively, a drone 135 may include other types of object detecting sensors 145 such as radar, LIDAR, camera, etc.

The drone 135 may include a GPS sensor 145 that provides GPS location coordinates of the drone 135, e.g., to a vehicle 100 computer 110, a drone 135 computer, etc. For example, the drone 135 computer may navigate the drone 135 based on the received GPS location coordinates, a predetermined route, etc.

The drone 135 may include one or more lights. For example, a computer 110 may be programmed to activate the drone 135 light 150 to illuminate an area surrounding the drone 135.

The drone 135 computer, the vehicle 100 computer 110, etc., may communicate with one another and with a remote computer 155 via a network 160 that includes one or more telecommunication protocols, e.g., cellular technologies such as 3G, 4G, Long-Term Evolution (LTE), etc., Bluetooth®, Bluetooth Low Energy®, WiFi, etc.

Figure 2:
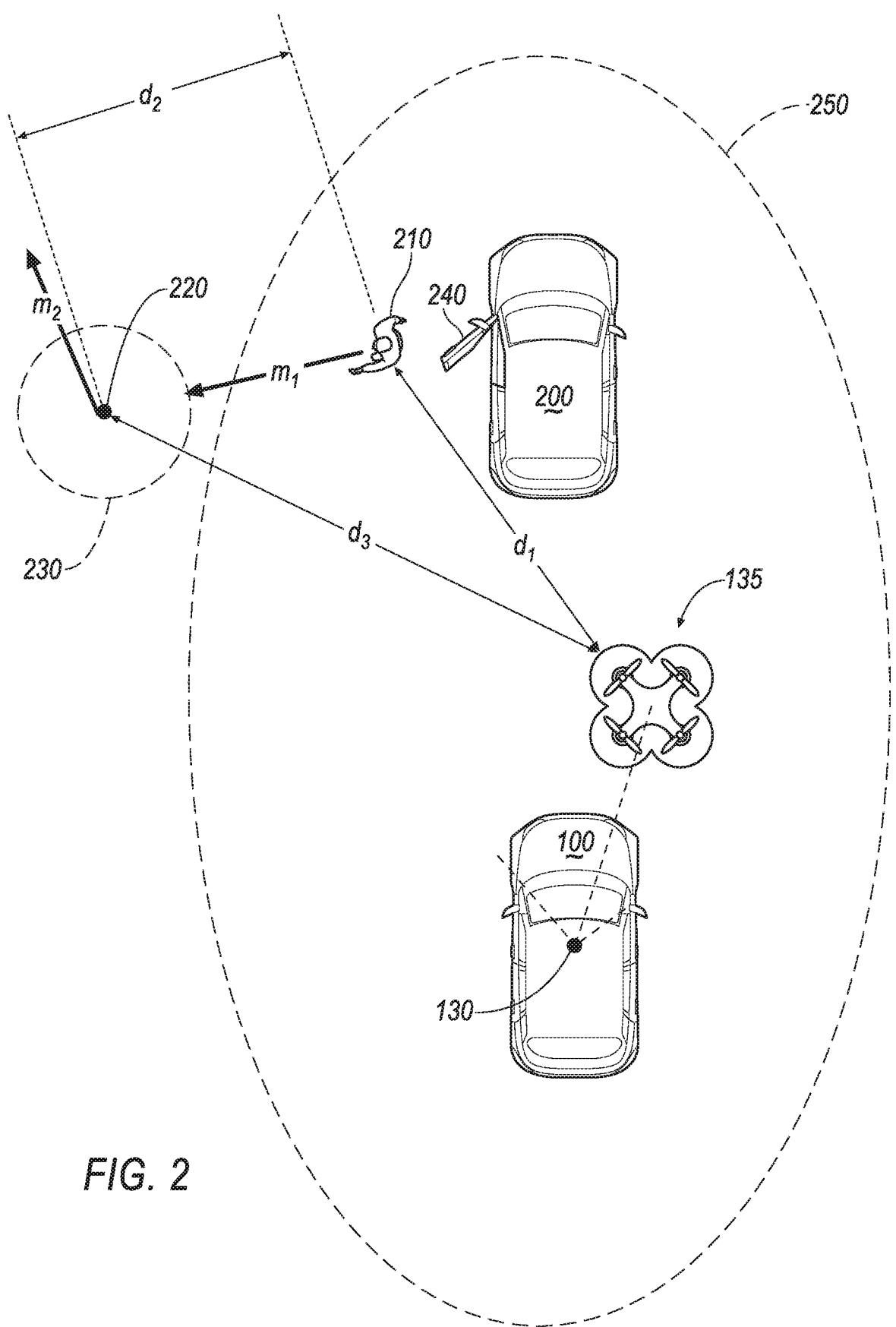
FIG. 2 is a diagram showing vehicles and a person departing from one of the vehicles.

As seen in FIG. 2, the vehicle 100 computer 110 may be programmed to determine a trajectory $m_1$ of a moving target 210 based on data received from the vehicle 100 sensors 120. The computer 110 may be further programmed to deploy the drone 135 from the vehicle 100 to track the moving target 210 based on the determined trajectory $m_1$.

A trajectory, in the context of present disclosure, refers to an expected movement path of a target imminently starting from a current location of the target 210. The trajectory $m_1$ of a moving human target 210 may include a curvature or a straight line on a ground surface that identifies an expected path of the human target 210. For example, the computer 110 may be programmed to determine the trajectory $m_1$ by repetitively (i.e., two or more times) identifying a location of the target 210, e.g., based on data received from LIDAR sensor 120, and fitting a curvature between the identified locations using known curve fitting techniques. In one example, the computer 110 may be programmed to readjust a predetermined trajectory $m_1$ based on a newly determined location of the target 210. For example, upon determining that a current location of the target 210 is not on the predetermined trajectory $m_1$ of the target 210, the computer 110 may be programmed to fit a new curve (i.e., an adjusted trajectory) between the current location and the previously determined locations of the target 210. Additionally or alternatively, the computer 110 may be programmed to determine the trajectory $m_1$ of a human target 210 based on various properties of the human target 210, e.g., a speed, a direction of a target 210 face, a body posture, etc. For example, the computer 110 may be programmed to determine the trajectory $m_1$ based on a virtual line that is perpendicular to a chest of the human target 210 and is directed to a forward direction of the target 210.

As one example, the computer 110 may be programed to deploy the drone 135 because the target 210 is inaccessible by the vehicle 100. For example, a user in the host vehicle 100 may select a second vehicle 200 to be tracked. In other words, the computer 110 may present via the HMI 125 image data including multiple vehicles 200 in a detection range 250 of the vehicle 100 sensors 120. The computer 110 may be programmed to select the vehicle 200 based on an entry via the HMI 125, e.g., touch screen. The computer 110 may be programmed to present information on the HMI 125 indicating current location and/or trajectory of the selected second vehicle 200 relative to the host vehicle 100. In one example, the vehicle 100 user may control vehicle 100 operation, e.g., accelerating, steering, braking, etc., to track (or pursue) the selected vehicle 200. In another example, the computer 110 may be programmed to operate the host vehicle 100 operation in an autonomous mode. Thus, the computer 110 may navigate the vehicle 100 based on current location and/or trajectory of the selected second vehicle 200.

The selected vehicle 200 may stop, e.g., because of a road blockage. In one example, a target 210, e.g., a human suspect, may depart from the selected vehicle 200. The computer 110 may be programmed to detect the target 210 upon determining that a door 240 of the selected vehicle 200 is open, e.g., based on data received from the vehicle 100 sensors 120. The computer 110 may be programmed to deploy the drone 135 to track the target 210.

The computer 110 may be programmed to deploy the drone 135 from the vehicle 100 trunk 165, e.g., upon determining that the vehicle 100 is unable to pursue the target 210. To deploy the drone 135 from the host vehicle 100, the computer 110 may actuate a trunk opening actuator 115 to open a trunk 165 door 170, e.g., moving from a closed position (see FIG. 1B) to an open position (see FIG. 1A). The computer 110 may be further programmed to actuate a vehicle 100 deployment device 175 to release the drone 135 from any number of in-vehicle locks that otherwise secure the drone 135 when it is not in use. Once released from the locks, the actuation commands to the drone 135 may include an actuation command for the drone 135 to exit the host vehicle 100 (i.e., fly out of the trunk 165) and hover above the host vehicle 100 (see FIG. 1A).

The deployment devices 175 are implemented via electromechanical actuators such as solenoids or other types of electromechanical devices that convert electric signals into motion. One or more actuators 115 may be used to lock the drone 135 in or to the host vehicle 100 when the deployable drone 135 is not in use. That is, those deployment devices 175 may be in a locked state while the deployable drone 135 is stored in, e.g., the trunk 165 of the host vehicle 100, and may transition to an unlocked state in response to receiving a control signal output by, e.g., the computer 110. For example, the deployment device 175 may include one or more solenoids that, when actuates, may hold the drone 135 in the locked position, e.g., by securing a body of the drone 135. For example, the deployment device 175 may include a clamp mechanically coupled to a solenoid. Upon activating the solenoid by the computer 110, the clamp may hold the drone 135, whereas upon deactivating the solenoid, the clamp may release the drone 135. Upon receiving a release signal from the computer 110, the deployment device 175 may move to the unlocked position and release the drone 135. Thus, in response to control signals output by the computer 110, the deployment devices 175 may transition to the unlocked state so the drone 135 can be released from, e.g., the trunk 165. The trunk opening actuator 115 may be used to release the trunk 165 door 170 or other door that allows the drone 135 to exit the host vehicle 100. The trunk opening actuator 115 may include a solenoid, and the computer 110 may be programmed to activate the trunk opening actuator 115 to open the trunk 165 door 170.

The computer 110 may be programmed to determine a current location of the target 210 based on the vehicle 100 sensor 120 data, and send an instruction to the drone 135 to fly to a destination based on the determined location of the target 210. In one example, the computer 110 may determine the current location of the target 210 upon detecting the target 210 that is departing from the vehicle 100, e.g., based on data received from the vehicle 100 sensors 120. The computer 110 may output the instruction including a location (e.g., according to latitude and longitude geo-coordinates) of the target 210. For example, the computer 110 may be programmed to determine the location of the target 210 based on relative location of the target 210 to the vehicle 100, e.g., using image processing techniques, and the location of the vehicle 100, e.g., received from the vehicle 100 GPS sensor 120.

Thus, actuating the drone 135 to fly to the location of the target 210 based on vehicle 100 sensor 120 data, may advantageously prevent a risk of losing the target 210. For example, in a crowded area, after departing from the selected vehicle 200, the target 210 may quickly, e.g., in a few seconds, move outside the detection range 250 of the vehicle 100 sensors 120. Thus, actuating the drone 135 to fly to the location of the target 210 based on the vehicle 100 sensor 120 data may provide uninterrupted tracking of the target 210. Uninterrupted tracking in the present context refers to a transition of tracking the target 210 based on data from vehicle 100 sensors 120 to tracking the target 210 based on data from the drone 135 sensors 145.

Upon deployment of the drone 135 from the vehicle 100, in one example, the computer 110 may be programmed to determine a location 220 based on the determined trajectory $m_1$, and actuate the drone 135 to fly to the determined location 220, e.g., instead of the current location of the target 210 as shown in FIG. 2. For example, the computer 110 may be programmed to determine a location 220 where an addition of a distance $d_1$ of the current location of the target 210 and a travelled distance $d_2$ of the target 210 is longer than a flight distance $d_3$ from the vehicle 100 to the location 220. The computer 110 may be programmed to determine an area 230 around the location 220 and actuate the drone 135 to fly to the area 230. In one example, the area 230 may be a circle centered at the location 220 with a diameter of 10 meters.

The computer 110 may be programmed to track the target 210, e.g., after detecting the target 210 within the area 230, by determining a current location of the target 210 based on drone 135 sensor 120 data. The computer 110 and/or the drone 135 computer may be programmed to, e.g., periodically every 50 ms, determine an updated trajectory $m_2$ of the target 210, and actuate the drone 135 to fly within a specified distance, e.g., 5 meters, from the target 210 while the target 210 moves. The computer 110 may be programmed to track the target 210 based on a current trajectory $m_2$ of the target 210 determined based on the drone 135 sensor 145 data.

The computer 110 may be programmed to receive data including location and/or trajectory of the drone 135 and/or the target 210, and output image and/or textual data to the vehicle 100 HMI 125 based on the received data. For example, the computer 110 may display, via the HMI 125, a schematic image of the target 210 on a map. The computer 110 may be programmed to output data, e.g., image, text, and/or audio, to a mobile device of a user.

The computer 110 may be programmed to actuate a drone 135 spray actuator 140 to spray ink on the target 210. For example, the computer 110 may be programmed to actuate the drone 135 to approach, e.g., within 3 meters of, the target 210, and spray ink, e.g., a photoluminescent-based ink that emits light in low light conditions. Thus, advantageously, the drone 135 may have an improved detection of the target 210, e.g., in low light conditions. For example, the computer 110 may be programmed to detect the target 210 (or distinguish the target 210 form other unsprayed objects) based on an expected wavelength of light emitted from the sprayed ink. Additionally or alternatively, the computer 110 may be programmed to spray ink on a surface, e.g., a landmark, an edge of a building 310, etc. within a predetermined distance such as 5 meter of the target 210. Thus, advantageously, another person and/or drone 135 pursuing the target 210 may determine that the target 210 has been within the predetermined distance of the sprayed surface based on the expected wavelength of light emitted from the sprayed surface.

Figure 3:
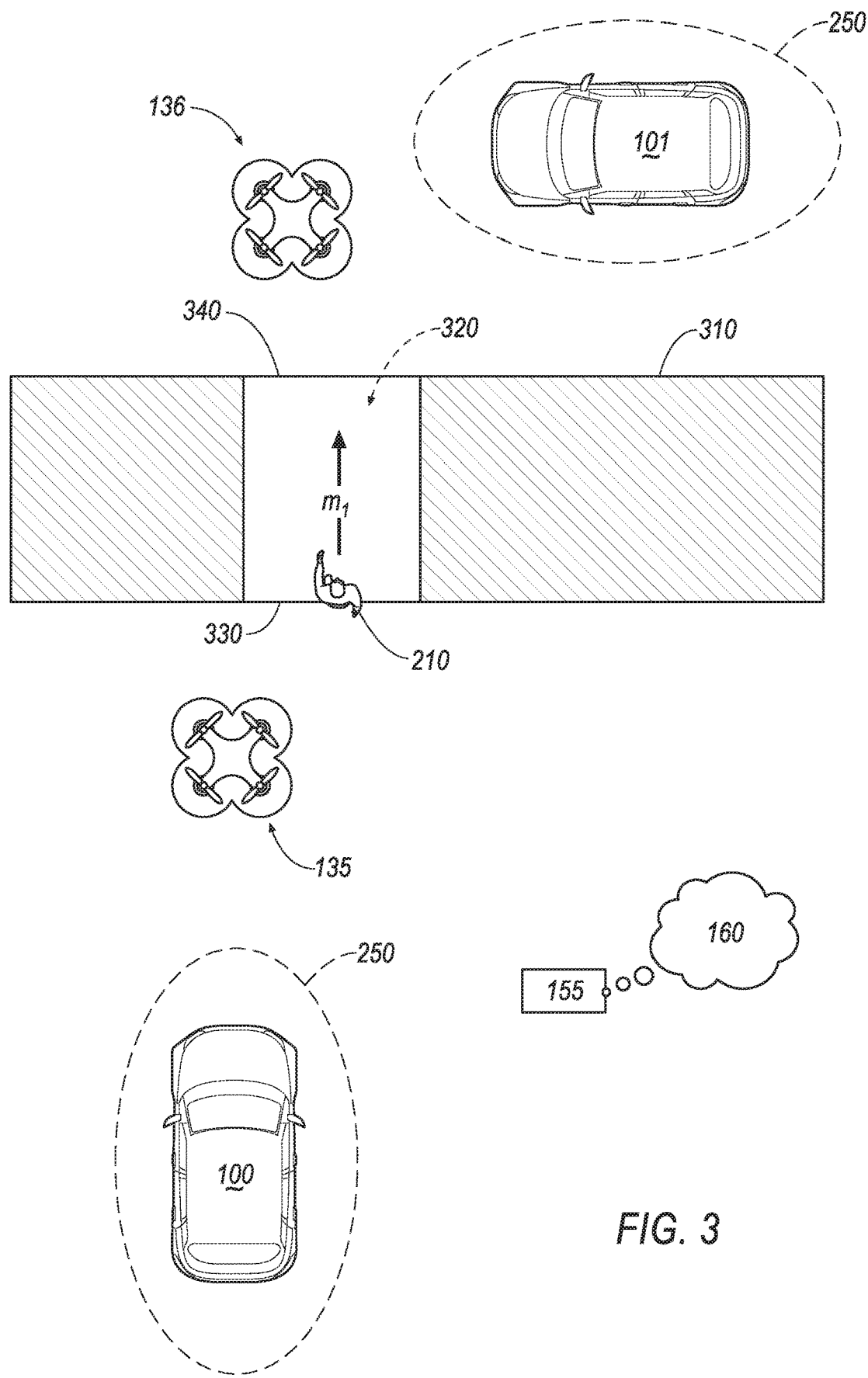
FIG. 3 is a diagram showing vehicles, drones, and a person moving inside a structure.

In one example, illustrated in FIG. 3, the computer 110 of the host vehicle 100 deploys a drone 135 to track the target 210. The target 210 may enter an area that is inaccessible for the drone 135, e.g., a hallway 320 of a building 310, a tunnel, a big crowd, etc. The vehicle 100 computer 110 may be programmed to determine that the target 210 entered the building 310, and transmit a last determined location, e.g., entrance location 330 of the building 310, and/or a last determined trajectory $m_1$ of the target 210 to a remote computer 155.

In one example, the remote computer 155 and/or the vehicle 100 computer 110 may be programmed to estimate an exit location 340 of the building 310 based on the entrance location 330, the last trajectory $m_1$, and an internal floor plan of the building 310. For example, the remote computer 155 may be programmed to estimate the exit location 340 based on a floor plan including the hallway 320. The remote computer 155 may be further programmed to identify a third vehicle 101 (referred to herein for convenience and to distinguish from the vehicles 100, 200 as a third vehicle 101) based on the estimated exit location 340 and location coordinates of the third vehicle 101. The third vehicle 101 computer 110 may, upon receiving an instruction from the remote computer 155, actuate a second drone 136 from the third vehicle 101 to fly to the expected exit location 340. Additionally or alternatively, the remote computer 155 may be programmed to identify multiple possible exit locations and actuate multiple drones 135 (e.g., from multiple vehicles 100) to fly to the identified exit locations. The host and the second vehicle 100, 101 may have common elements, including a computer 110, actuators 115, sensors 120, trunk 165, and/or an HMI 130, as disclosed above. The drone 135 associated with the host vehicle 100 and the second drone 136 associated with the third vehicle 101 may have common elements, including propeller actuators 140, sensors 145, etc., a disclosed above.

Processing

Figure 4A:
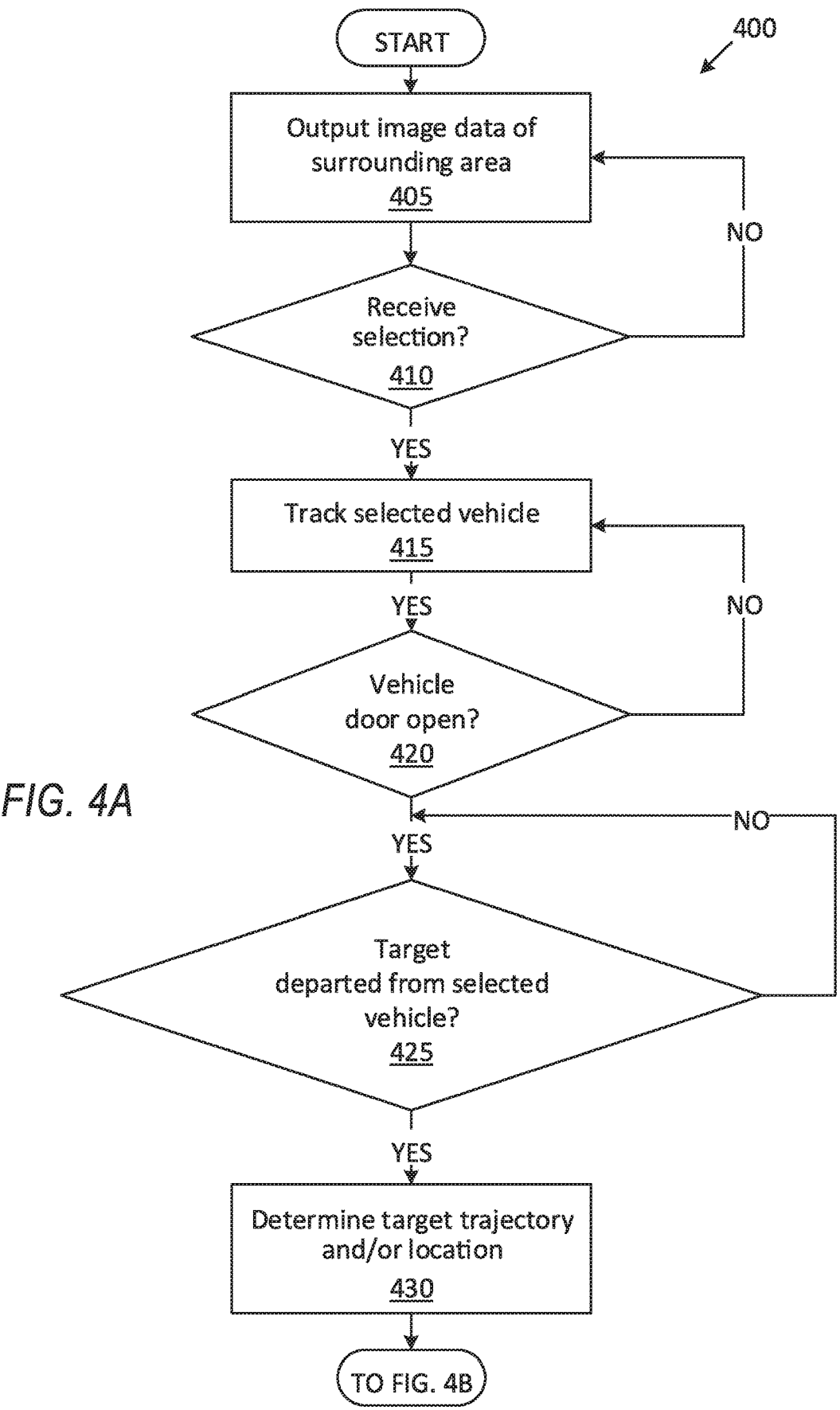
Figure 4C:
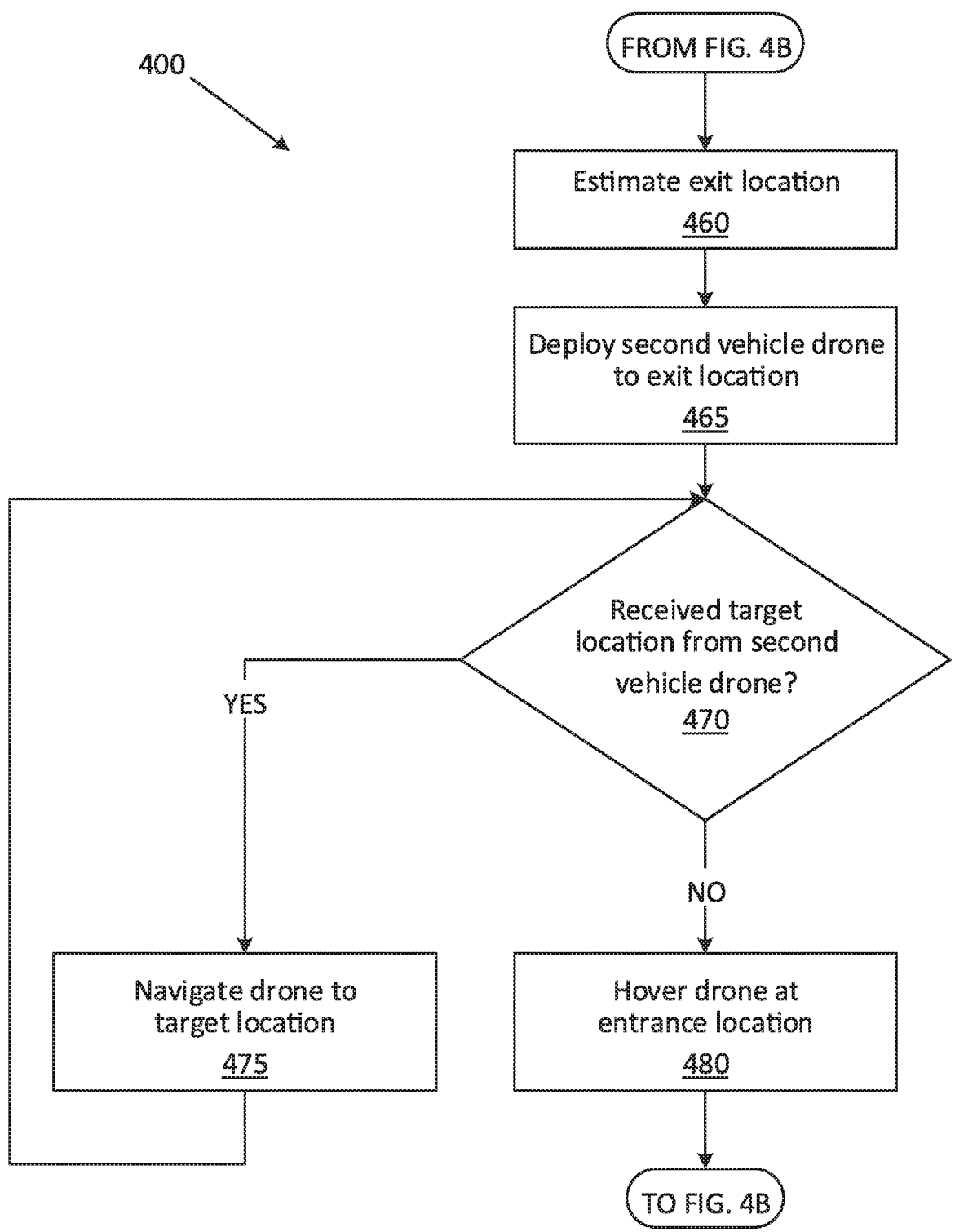

FIGS. 4A-4C show an example process 400 for pursuing a target 210. For example, the vehicle 100 computer 110 may be programmed to execute blocks of the process 400. Additionally or alternatively, the vehicle 100 computer 110, the drone 135 computer, the remote computer 155, an/or a combination thereof may be programmed to execute blocks of the process 400.

The process 400 begins in a block 405, in which the computer 110 outputs image data including a surrounding area, e.g., the detection range 250, of the host vehicle 100. In one example, the computer 110 may be programmed to receive data from various vehicle 100 sensors 120, e.g., LIDAR, radar, camera sensors 120, and output image data based on the received sensor data to a display of the host vehicle 100 HMI 125.

Next, in a decision block 410, the computer 110 determines whether a second vehicle 200 is selected. The computer 110 may be programmed to select a vehicle 200 or any other object based on entry via the HMI 125. For example, a user in the host vehicle 100 may touch an HMI 125 screen to select a vehicle 200 shown on the HMI 125 screen. If the computer 110 determines that a vehicle 200 is selected, then the process 400 proceeds to a block 415; otherwise the process 400 returns to the block 405.

In the block 415, the computer 110 navigates the host vehicle 100 to track the selected vehicle 200. For example, the computer 110 may be programmed to track the selected vehicle 200 by operating the vehicle 100 in an autonomous mode such that a predetermined distance, e.g., 20 meters, between the host vehicle 100 and the selected vehicle 200 is maintained. As another example, the computer 110 may be programmed to output navigation instructions to the vehicle 100 HMI 125, and a vehicle 100 user may control the vehicle 100 in a non-autonomous mode based on the outputted navigation instructions.

Next, in a decision block 420, the computer 110 determines whether a door 240 of the selected vehicle 200 is open. For example, the computer 110 may be programmed to determine whether a vehicle 200 door 240 is open based on data received from, e.g., the LIDAR, radar, camera sensors 120 of the vehicle 100. Additionally or alternatively, the computer 110 may be programmed to determine whether the selected vehicle 200 has an open roof, e.g., a convertible. In another example, the computer 110 may be programmed to determine whether a door of a trailer attached to the selected vehicle 200 is open. If the computer 110 determines that a door 240 of the selected vehicle 200 is open, then the process 400 proceeds to a decision block 425; otherwise the process 400 returns to the block 415.

In the decision block 425, the computer 110 determines whether the target 210 departed from the selected vehicle 200, e.g., using known image processing techniques. If the computer 110 determines that the target(s) 210 has/have departed from the selected vehicle 200, then the process 400 proceeds to a block 430; otherwise the process 400 returns to the decision block 425.

In the block 430, the computer 110 determines a trajectory and/or a location of the target 210. For example, as shown in FIG. 2, the computer 110 may be programmed to determine a location and/or a trajectory $m_1$ of the target 210. Additionally or alternatively, the computer 110 may be programmed to determine locations and/or trajectories of multiple targets departing from the selected vehicle 200. Additionally or alternatively, the computer 110 may be programmed to select the target 210 from multiple detected persons departing from the selected vehicle 200, e.g., based on facial recognition.

Tuning to FIG. 4B, next, in a block 435, the computer 110 deploys the drone 135, e.g., by actuating the drone 135 in the host vehicle 100 trunk 165 to fly out of the vehicle 100. The computer 110 may be programmed to deploy the drone 135 by actuating a vehicle 100 actuator 115 to unlock the drone 135, actuating a vehicle 100 actuator 115 to open the trunk 165 door 170, and actuating the drone 135 to fly. The computer 110 may be programmed to transmit data to the drone 135 including the determined location and/or the trajectory of the target 210.

Next, in a block 440, the computer 110 navigates the drone 135 based on the determined location and/or trajectory. For example, as shown in FIG. 2, the computer 110 may be programmed to navigate the drone 135 based on the trajectory $m_1$ of the target 210, the location of the target 210, the location of the host vehicle 100, etc.

Next, in a block 445, the computer 110 actuates the drone 135 to track the target 210. The computer 110 may be programmed to track the target 210 based on the location and/or trajectory of the target 210. For example, the computer 110 may be programmed to determine a current location of the target 210 based on drone 135 sensor 145 data, and to actuate the drone 135 to fly within a specified distance, e.g., within an area 230, from the target 210 while the target 210 moves. In one example, the computer 110 may be programmed to determine the trajectory $m_1$ of the target 210 by repetitively identifying a location of the target 210, e.g., based on data received from the drone 135 sensors 145, and fitting a curvature between the identified locations using known curve fitting techniques. Additionally, the computer 110 may be further programmed to actuate a drone 135 actuator 140 to spray ink on the target 210 and/or a surface within a predetermined distance from the target 210, while the drone 135 tracks the target 210.

Next, in a decision block 450, the computer 110 determines whether a tracking session of the target 210 has finished, e.g., based on receiving an entry via the vehicle 100 HMI 125. If the computer 110 determines that the tracking session ended, then the process 400 proceeds to a block 452; otherwise, the process 400 proceeds to a decision block 455.

In the block 452, the computer 110 actuates the drone 135 to navigate to a current location of the host vehicle 100, e.g., based on location coordinates received from the vehicle 100 GPS sensor 120. The computer 110 may be further programmed to actuate the drone 135 to land in a designated area, e.g., the trunk 165, of the host vehicle 100. For example, the computer 110 may be programmed to actuate the trunk 165 door 170 to open, to actuate the drone 135 to land in the trunk 165. The computer 110 may actuate a vehicle 100 actuator to lock (secure) the drone 135 in place, and may then actuate the trunk 165 door 170 to close. Following the block 452, the process 400 ends, or alternatively returns to the block 405, although not shown in FIGS. 4A-4B.

In the decision block 455, the computer 110 determines whether the target 210 has entered an inaccessible area, e.g., a building 310, a tunnel, etc. if the computer 110 determines that the target 210 entered an inaccessible area, then the process 400 proceeds to a block 460 (see FIG. 4C); otherwise the process 400 returns to the block 445.

Turning to FIG. 4C, in the block 460, the computer 110 estimates an exit location of the target 210 from the inaccessible area. For example, the computer 110 may be programmed to estimate an exit location 340 of the building 310 based on the entrance location 330, the last trajectory $m_1$, and an internal floor plan of the building 310 (see FIG. 3). The computer 110 may be programmed to determine location coordinates of the estimated exit location(s).

Next, in a block 465, the computer 110 deploys a third vehicle 101 drone 136 to the estimated exit location, e.g., by transmitting location coordinates of the estimated exit location 340 to the remote computer 155.

For example, the computer 110 and/or the remote computer 155 may be programmed to identify the third vehicle 101 based on the identified location coordinates of the exit location 340 and location coordinates of the third vehicle 101. In one example, the computer 110 may be programmed to deploy multiple drones 135 from one or more second vehicles 101, e.g., when multiple possible exit locations are estimated for the target 210 in the inaccessible area.

Next, in a decision block 470, the computer 110 determines whether the computer 110 has received location coordinates of the target 210 from the deployed third vehicle 101. As described below with reference to FIG. 5, the third vehicle 101 computer 110 may be programmed to navigate to the exit location 340, detect the target 210, identify location coordinates and/or trajectory of the target 210. If the computer 110 determines that the location coordinates and/or the trajectory of the target 210 is received from the third vehicle 101, then the process 400 proceeds to a block 475; otherwise the process 400 proceeds to a block 480.

In the block 475, the computer 110 navigates the drone 135 based on the received location coordinates of the target 210. For example, the computer 110 may actuate the drone 135 to fly to a current location of the target 210 based on the location coordinates and/or trajectory of the target 210 received, e.g., from the third vehicle 101 drone 136, the remote computer 155, etc. With reference to FIG. 3, the computer 110 may be programmed to plan a route around the building 310 to navigate the drone 135 to the location of the target 210.

In the block 480, the computer 110 actuates the drone 135 to hover over the entrance location 330 of the inaccessible area. Alternatively, the computer 110 may actuate the drone 135 to return to the host vehicle 100. Following the block 480, the process 400 proceeds to the block 440 (see FIG. 4B).

Figure 5:
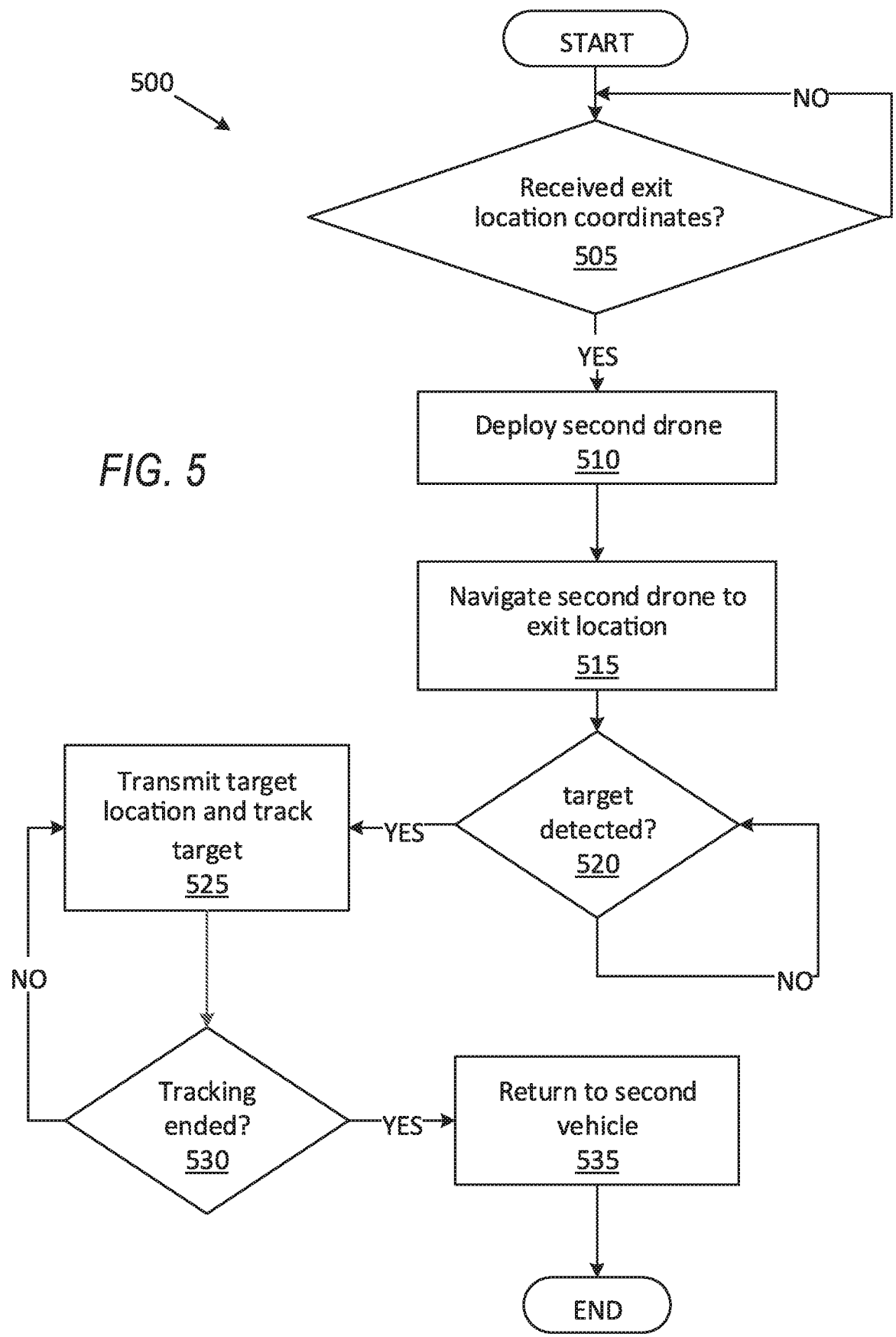
FIG. 5 is a flowchart of an exemplary process for a client vehicle receiving control commands from a host vehicle.

FIG. 5 shows an example process 500 for a third vehicle 101 receiving control commands from the host (or first) vehicle 100. For example, a third vehicle 101 computer 110 may be programmed to execute blocks of the process 500.

The process 500 begins in a decision block 505, in which the vehicle 101 computer 110 determines whether, e.g., estimated exit location 340 coordinates, of a target 210 are received, e.g., from a host vehicle 100 computer 110, the remote computer 155, etc. If the third vehicle 101 computer 110 determines that the estimated exit location coordinates are received, then the process 500 proceeds to a block 510; otherwise the process 500 returns to the decision block 505.

In the block 510, the third vehicle 101 computer 110 deploys a second drone 136, e.g., from the third vehicle 101 trunk 165.

Next, in a block 515, the computer 110 of the third vehicle 101 navigates the second drone 136 to the exist location 340. The third vehicle 101 computer 110 may be programmed to navigate the second drone 136 based on the received location coordinates of the estimated exit location 340.

Next, in a decision block 520, the computer 110 of the third vehicle 101 determines whether the target 210 is detected, e.g., within a predetermined distance of the exit location 340. For example, the computer 110 of the third vehicle 101 may be programmed to detect the target 210 using known image processing techniques, e.g., based on received information from the host vehicle 100. The computer 110 of the third vehicle 101 may be programmed to detect the target 210 based on received information including a picture of the target 210, wavelength of emitted light from an ink sprayed on the target 210 by the host vehicle 100 drone 135, etc. If the computer 110 of the third vehicle 101 determines that the target 210 is detected, then the process 500 proceeds to a block 525; otherwise the process 500 returns to the decision block 520.

In the block 525, the computer 110 of the third vehicle 101 transmits location coordinates and/or trajectory of the detected target 210, e.g., to the host vehicle 100, the remote computer 155, etc. The computer 110 may be programmed to track the detected target 210, e.g., flying within a predetermined distance of the target 210. Additionally or alternatively, the computer 110 of the third vehicle 101 may be programmed to periodically, e.g., every second, transmit current location coordinates and/or trajectory of the target 210 while flying within a predetermined distance of the target 210.

Next, in a decision block 530, the computer 110 of the third vehicle 101 determines whether a tracking session of the target 210 has ended, e.g., upon determining that the host vehicle 100 drone 135 has arrived within a predetermined distance such as 10 meters of the target 210. Additionally or alternatively, upon receiving a control command from the drone 135 of the first vehicle 100 including a request to end the tracking of the target 210, the computer 110 of the third vehicle 101 may be programmed to determine that the tracking session has ended. If the computer 110 of the third vehicle 101 determines that the tracking session ended, then the process 500 proceeds to a block 535; otherwise the process 500 returns to the block 525.

In the block 535, the computer 110 of the third vehicle 101 actuates the second drone 136 to return to the third vehicle 101. For example, the computer 110 actuates the second drone 136 to land in the third vehicle 101 trunk 165. Additionally, the computer 110 of the third vehicle 101 may be programmed to open the trunk 165 door 170 prior to landing of the second drone 136 and actuates the trunk 165 door 170 to close after landing of the second drone 136.

Following the block 535, the process 500 ends.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, programmed to:
   determine a trajectory of a moving target based on data from one or more vehicle sensors; and
   deploy an aerial drone from the vehicle to track the moving target based on the determined trajectory.

2. The computer of claim 1, further programmed to:
   determine a current location of the target based on the data from the one or more vehicle sensors; and
   send an instruction to the aerial drone to fly to a destination based on the determined current location.

3. The computer of claim 1, further programmed to:
   determine a location based on the determined trajectory; and
   actuate the drone to fly to the determined location.

4. The computer of claim 1, further programmed to track the target by:
   determining a current location of the target based on aerial drone sensor data; and
   actuating the drone to fly within a specified distance from the target while the target moves.

5. The computer of claim 4, further programmed to track the target based on a current trajectory of the target determined based on the aerial drone sensor data.

6. The computer of claim 1, further programmed to:
determine that the target entered an area that is inaccessible for the drone; and
transmit a last determined location and trajectory of the moving target to a remote computer.

7. The computer of claim 1, further programmed to:
detect a second vehicle based on the data from the one or more vehicle sensors; and
detect the moving target when the moving target departs the second vehicle.

8. The computer of claim 7, further programmed to detect the moving target upon determining that a door of the second vehicle is open.

9. The computer of claim 1, further programmed to actuate a drone actuator to spray ink on the moving target.

10. The computer of claim 1, further programmed to track the moving target by detecting a specific ink on the moving target.

11. A method, comprising:
determining a trajectory of a moving target based on data from one or more vehicle sensors; and
deploying an aerial drone from the vehicle to track the moving target based on the determined trajectory.

12. The method of claim 11, further comprising:
determining a current location of the target based on the data from the one or more vehicle sensors; and
sending an instruction to the aerial drone to fly to a destination based on the determined current location.

13. The method of claim 11, further comprising:
determining a location based on the determined trajectory; and
actuating the drone to fly to the determined location.

14. The method of claim 11, further comprising tracking the target by:
determining a current location of the target based on aerial drone sensor data; and
actuating the drone to fly within a specified distance from the target while the target moves.

15. The method of claim 11, further comprising tracking the target based on a current trajectory of the target determined based on the aerial drone sensor data.

16. The method of claim 11, further comprising:
determining that the target entered an area that is inaccessible for the drone; and
transmitting a last determined location and trajectory of the moving target to a remote computer.

17. The method of claim 11, further comprising:
detecting a second vehicle based on the data from the one or more vehicle sensors; and
detecting the moving target when the moving target departs the second vehicle.

18. The method of claim 17, wherein detecting the moving target is performed only upon determining that a door of the second vehicle is open.

19. The method of claim 11, further comprising actuating a drone actuator to spray ink on the moving target.

20. The method of claim 11, wherein tracking the moving target further includes detecting a specific ink on the moving target.

\* \* \* \* \*